(12) United States Patent
Scheck et al.

(10) Patent No.: US 6,244,649 B1
(45) Date of Patent: Jun. 12, 2001

(54) DEVICE FOR SECURING A VEHICLE SEAT NON-PERMANENTLY TO THE VEHICLE FLOOR

(75) Inventors: Georg Scheck, Weitrramsdorf; Johann Gerhardt Josef Rampel, deceased, late of Schorkendorf; by Hannelore Lisselotte Ilse Rampel, nee Schmidt legal representative; by Marion Christine Okorie, nee Rampel legal representative, both of Schorkendorf; Uwe Klippert, Oberaula; Christian Alt, Coburg, all of (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/077,587
(22) PCT Filed: Nov. 28, 1996
(86) PCT No.: PCT/DE96/02327
§ 371 Date: Aug. 6, 1999
§ 102(e) Date: Aug. 6, 1999
(87) PCT Pub. No.: WO97/19829
PCT Pub. Date: Jun. 5, 1997

(30) Foreign Application Priority Data

Dec. 1, 1995 (DE) ............................. 195 44 833

(51) Int. Cl.⁷ ................................................. B60N 2/04
(52) U.S. Cl. .................... 296/65.03; 297/336; 248/503.1
(58) Field of Search ..................... 296/65.03; 297/336; 248/503.1

(56) References Cited

U.S. PATENT DOCUMENTS

| | | |
|---|---|---|
| 4,495,887 | 1/1985 | Mondrush . |
| 5,238,285 | 8/1993 | Holdampf et al. . |
| 5,282,662 | 2/1994 | Bolsworth et al. . |
| 5,562,322 | 10/1996 | Christoffel . |
| 5,765,894 | * 6/1998 | Okazaki et al. .................. 296/65.03 |

FOREIGN PATENT DOCUMENTS

| | | |
|---|---|---|
| 4408686 | 4/1995 | (DE) . |
| 4404935 | 8/1995 | (DE) . |
| 0537078 | 4/1993 | (EP) . |
| 0609130 | 8/1994 | (EP) . |
| 0618102 | 10/1994 | (EP) . |

* cited by examiner

*Primary Examiner*—Joseph D. Pape
(74) *Attorney, Agent, or Firm*—Christie, Parker & Hale, LLP

(57) ABSTRACT

The device for the detachable connection of a vehicle seat with the vehicle floor with a rear fixing hook open in the travel direction and in which a fixing bolt on the vehicle floor can engage, and a front slide guide for supporting the vehicle seat on the front fixing bolt as well as a rotatably mounted claw-like locking lever biased by a spring force to lock the front fixing bolt in the slide guide wherein the rear fixing bolt is associated with a swivel mounted claw-like primary locking element biased by a spring force against the locking position, wherein the position of the primary locking element on reaching the locking position can likewise be locked by a secondary locking element, is characterized in that the front primary locking element and the rear secondary locking element are coupled together by a coupling element, preferably a coupling rod.

13 Claims, 6 Drawing Sheets

DEVICE FOR SECURING A VEHICLE SEAT NON-PERMANENTLY TO THE VEHICLE FLOOR

BACKGROUND OF THE INVENTION

The invention relates to a device for the detachable connection of a vehicle seat that guarantees a secure locking and when necessary a simple unlocking of the vehicle seat.

From German Patent DE A1 44 04 935 a device is known for connecting a vehicle seat to a vehicle floor which uses for locking the seat to a bolt of the front bearing block a double-armed locking lever, and for locking with the bolt of the rear bearing block a hook which is open in the travel direction. The double-armed locking lever is held in the unlocked position by a spring in a stop wherein the free end of the one arm is associated with a stop fixed on the vehicle floor. After inserting the fixing point of the vehicle seat into the floor-side bearing blocks, the seat is pushed forwards to produce the keyed locking connection whereby the rear fixing bolt enters between the flanks of the rear fixing hook. At the same time the seat slides inclined down and forwards on a guide slide of a support plate which also supports the double-armed locking lever. This produces an engagement of the floor-side support with the one arm of the locking lever and its swivelling in the direction of the locking position. After reaching a certain swivel angle, the active direction of the spring on the locking element changes round so that this locking element is automatically drawn into the locking position.

The described device does indeed allow a single locking and unlocking of a vehicle seat but it does have the drawback however that the rear locking point is designed in the form of an open hook and cannot absorb forces against the travel direction. In the event of a rear impact crash the front locking point would have to divert the entire energy connected therewith. Furthermore it cannot be completely ruled out that the seat is locked in the front bearing block while the rear fastening hook does not enclose the fixing bolt but stands up on same. Such an unsecured seat gives rise to a considerable risk of accident and injury.

German Patent DE 44 08 696 C1 describes a device for connecting a longitudinal support of a vehicle seat with the vehicle structure whereby a fixing claw which is open to the back engages round a fixing bolt fixed on the body so that even crash forces produced at the rear can be absorbed. After the rear fixing area has been brought into positive engagement the front fixing claw can be lowered onto the associated fastening bolt and can be secured by means of a locking element.

A disadvantage here however is that a locking of the front seat area can also then take place when the rear fixing area rests on the fixing bolt on the bodywork side, i.e. when no rear locking exists. Such a faulty mounting can, during operation of the vehicle, more particularly with severe negative accelerations, lead to the seat folding forwards and thus to severe injury to the user.

From U.S. Pat. No. 5,282,662 a device is known for detachably connecting a vehicle seat to the vehicle floor. The device has two front and two rear slide guides. Fixing bolts are located in engagement with each engagement of the front and rear slide guide. The vehicle seat is fixed or locked on the fixing bolts by fixing hooks. Furthermore the known device has a rod which connects a support foot with a leg of the vehicle seat. In order to remove the vehicle seat it is folded into a vertical position whereby the rear slide guides (or legs of the seat) fold together as a result of their connection with the foot through the rod.

Even with this known device a locking of the front seat area can take place even if the rear fixing area is not properly locked.

SUMMARY OF THE INVENTION

The object of the present invention is therefore to produce a device for detachably locking a vehicle seat to the floor of a motor vehicle which guarantees a simple and at the same time reliable locking and unlocking of the vehicle seat.

According to the invention the locking processes of the front and rear locking devices are connected together by a coupling element, for example a coupling rod wherein the force required for the swivel movements of the front locking element and the secondary locking element is applied by a common spring element. It can thereby be ensured that a locking of the seat with the front fixing bolt can only take place when the rear seat locking has been safely completed.

In order to achieve a still higher standard of safety the embodiment last described is completed by a blocking element which does not allow the release of the locking process at the front fixing bolt if the fixing bolt has still not reached the intended area of the slide guide of the front support plate. The likewise swivelling blocking element, biased by a spring prevents, through a support of the blocking element, its locking movement until the blocking element is forced by the fixing bolt against the spring force out of the covering area above the slide guide.

The additional use of a primary locking element whose position on reaching the locking state is locked by a secondary locking element secures the fixing bolt in the slide guide of the rear fixing hook which is open on one side. It is thereby prevented that the rear seat fastening can become inoperative, particularly following a rear impact crash wherein the floor group is temporarily deformed three-dimensionally or elastically. Through the enormous elastic tensions which thereby occur in the seat frame the seat would then be spun forwards whereby it swivels about the front fixing points. The risk of injury which occurs can thereby be considerable.

In a preferred embodiment of the invention the claw-like swivel-mounted primary locking element is biased by a spring element against the locking direction and is at first held by a secondary element in a position which engages over the entrance to the slide guide of the fixing hook. Thus, during assembly of the seat on the vehicle floor, the fixing hook first passes into the claw of the primary locking element and only then in sequence into the slide guide of the fixing hook. On reaching the locking position provided the secondary locking element locks the position of the primary locking element and thus also the position of the fixing bolt in the slide guide of the fixing hook. The secondary locking element is also preferably spring-loaded so that the locking process develops practically automatically and reliably.

A device is thus provided for detachably locking a vehicle seat to the vehicle floor which apart from a substantially increased security in the event of a rear impact crash and simple handling also has a high security against a possible faulty locking. Both in the front and in the rear area the locking can only take place when both fixing bolts have occupied the prescribed ideal position. The locking state can easily be established by checking the position of the easily accessible handle at the front locking element.

By means of this handle it is likewise possible to readily release the front and rear locking. After the handle has been drawn upwards the blocking element again drops before the locking element into the slide guide area of the support plate.

By sliding the seat backwards the rear fixing hook also releases the relevant fixing bolt. The seat can now be lifted out of the bearing blocks of the vehicle floor.

BRIEF DESCRIPTION OF THE DRAWINGS

The invention will now be explained with reference to the two embodiments shown in the drawings in which:

FIG. 2b is a similar view to FIG. 2a, but during the locking process; and

DETAILED DESCRIPTION OF THE INVENTION

Figure 1A:
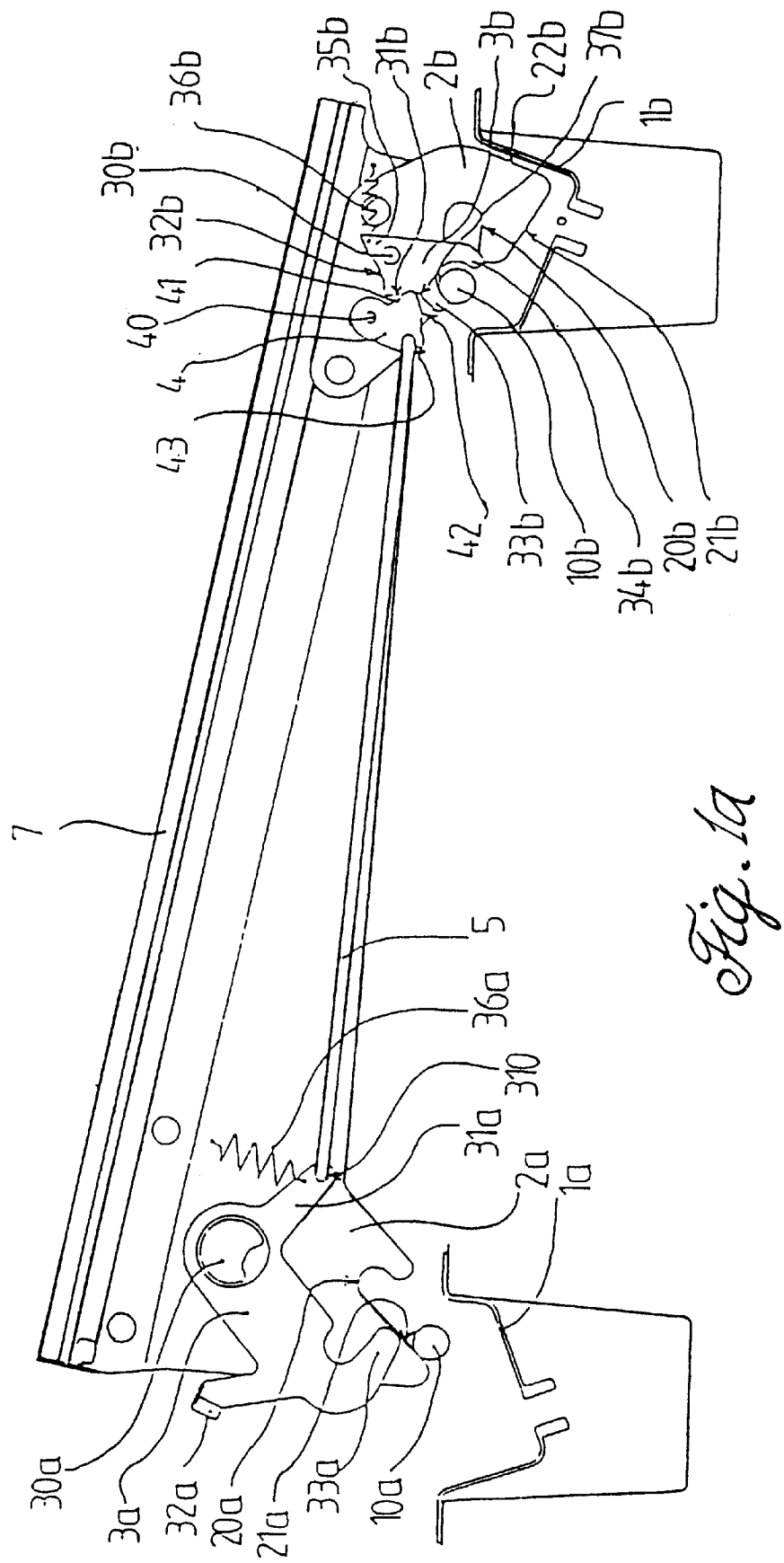
FIG. 1a is a diagrammatic side view of a seat understructure with open lockings front and back which are connected by a coupling rod, after the insertion of the seat understructure in the bearing blocks of the vehicle floor.

The side view of FIG. 1a shows diagrammatically the structure of a seat understructure whose locking elements connect the vehicle seat to the vehicle floor through the fixing bolts 10a, 10b which belong to the bearing blocks 1a, 1b. The diagrammatic illustration of the seat frame is restricted substantially to the guide rail 7 which is in positive-locking displaceable engagement with a guide rail mounted on a seat upper frame (not shown), and the support plate 2a which on one side is with its slide guide 20a part of the front locking and on the other side supports the locking element 3a in the swivel axis 30a.

The rear seat fastening has a fixing hook 2b with a slide guide 20b open to the front for the fixing bolt 10b. At first however the entrance to the slide guide 20b is blocked by the claws 33b, 34b of the primary locking element 3b which is pressed by a tensile spring 36b with its stop 37b against the secondary locking element. To this end the tensile spring 36b engages on an arm 35b opposite the claw area so that the claw 33b, 34b is drawn in the direction of the opening of the slide guide 20b. In the illustrated position of the primary and secondary locking element 3b, 4, the rear fixing bolt 10b passes as the seat is set down into the bearing socket 1a, 1b automatically between the claw-forming stops 33b, 34b of the primary locking element, and indeed even then when the seat is incorrectly set down and at first strikes with the edge 21b of the fixing hook 2b on the fixing bolt 10b or stops with the edge 22b on the bearing block 1b.

In this starting position the front fixing bolt 10a adjoins the stop 21a which opens directly into the slide guide 20a. A locking swivel movement of the locking element 3a must still not take place however just yet, since the hook 33a can still not grip the bolt 10a in this position. A tensile spring 36a suspended from the support plate 2a and engaging on the arm 31a does indeed exert a correspondingly aligned force on the locking element 3a but the swivel movement is blocked by a coupling rod 5 which is connected on one side to the arm 31a through its front suspension 310 and on the other side for articulated movement with the secondary locking element through its rear suspension. Through the coupling rod 5 thus not only are the kinematic developments of the front and rear locking elements co-ordinated but the spring force of the tensile spring 36a which is required for the functional reliability of the device according to the invention is passed on to the secondary locking element 4.

Figure 1B:
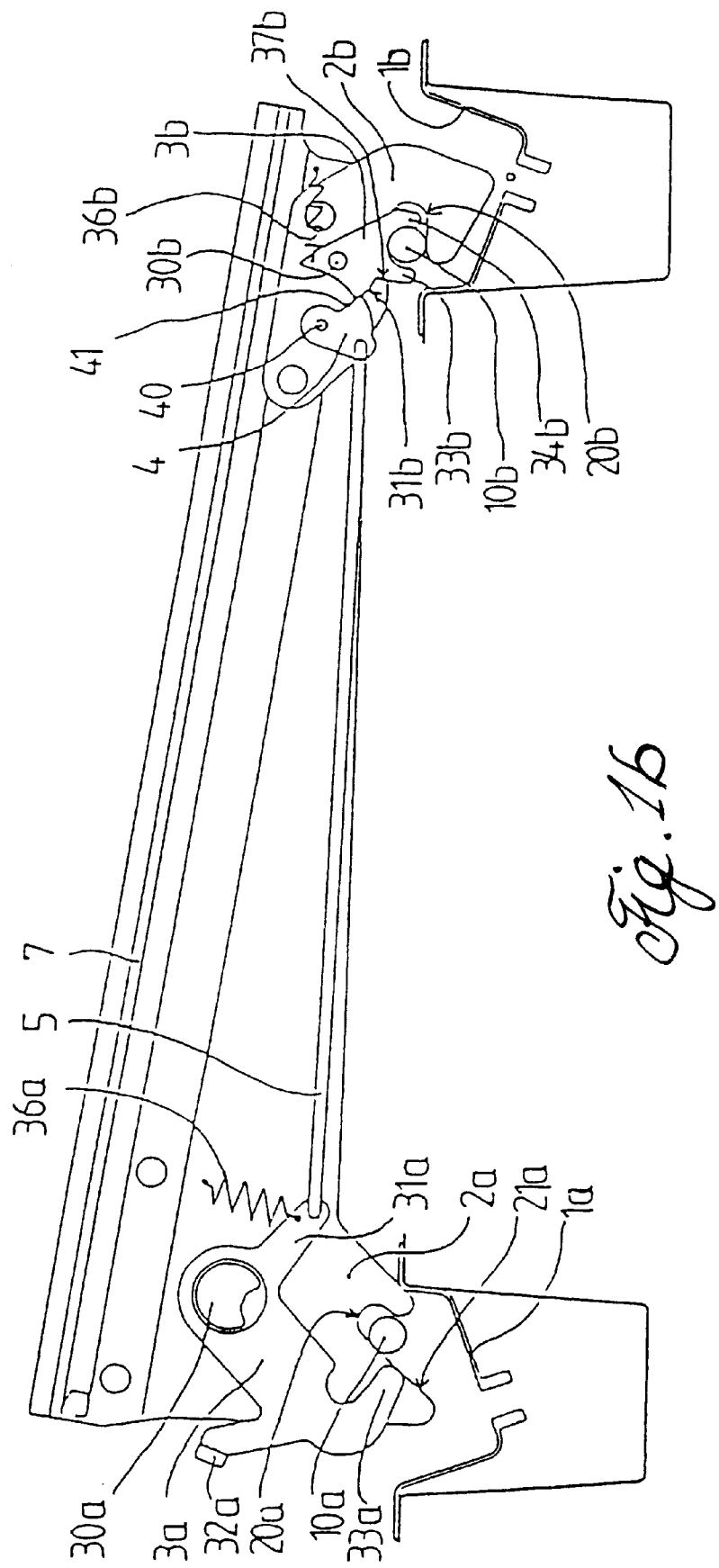
FIG. 1b is a similar view to FIG. 1a but during the locking process.

FIG. 1b shows a further phase of the assembly and locking process in which the seat frame was pushed forwards by a certain amount. It can clearly be seen that the fixing bolt 10b is thereby pressed against the stop 34b. The swivel movement of the primary locking element 3b about the axis 30b which is connected therewith leads to an increase in the tension of the spring 36b which is mounted between the seat frame and arm 35b.

It can also be seen that the position of the front locking element 3a has still not changed up to this phase of the assembly process although the front fixing bolt 10a has already moved forward practically half way into the slide guide 20a; it is however still not yet in its ideal position. Movements of all the other elements 3a, 5 coupled thereto are also blocked through the likewise unchanged position of the secondary locking element 4. This takes place so long as the stop of the secondary locking element 4 is not released from the curved section 31b of the primary locking element 30 and a rotation about the axis 40 is blocked. The contour of the curved section 31b preferably lies on a circular arc about the axis 30b.

Figure 1C:
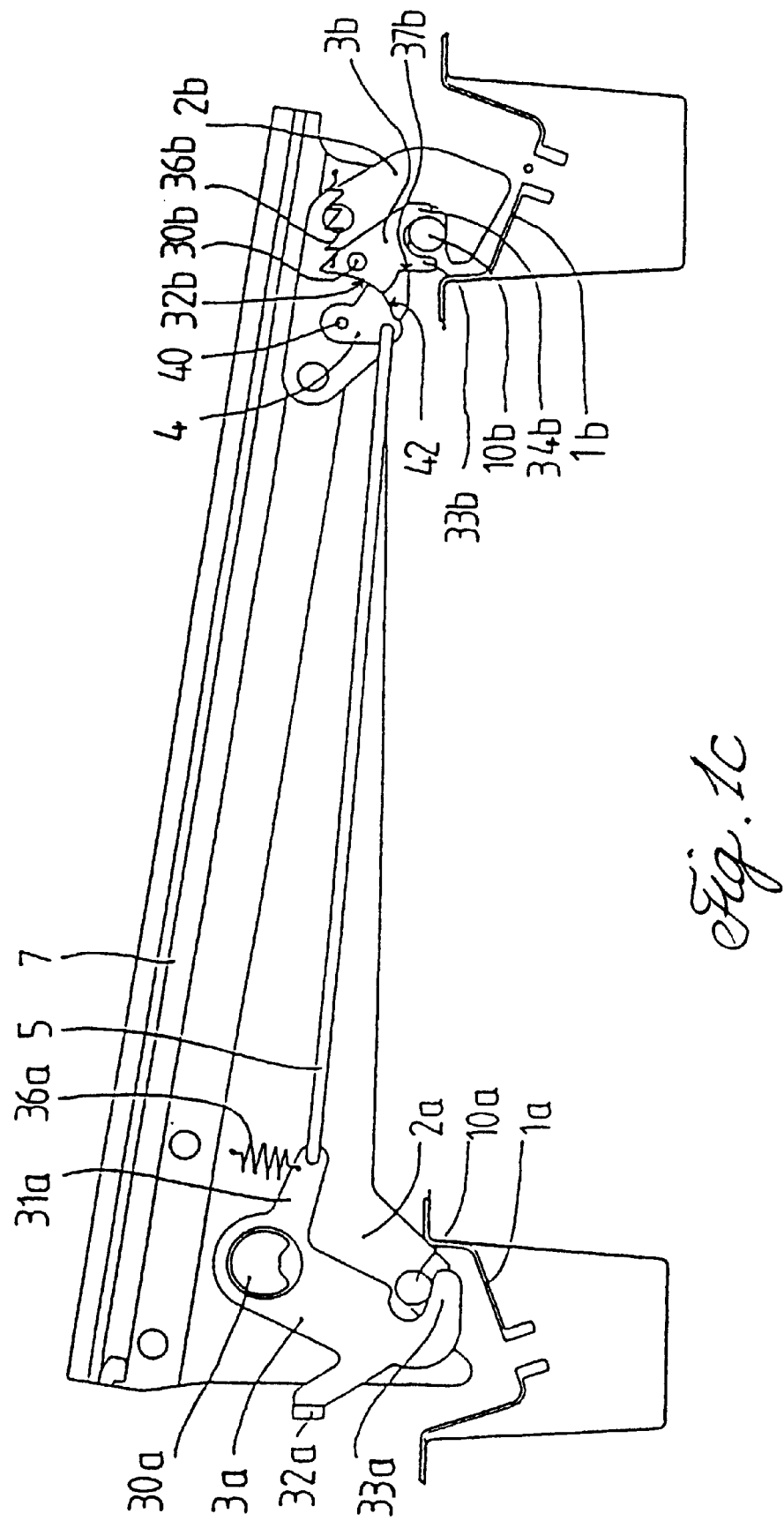
FIG. 1c is a similar view to FIG. 1a, but at the end of the locking process.

FIG. 1c shows the device in the completely locked state wherein both fixing bolts 10a, 10b have occupied their intended positions in the slide guides 20a, 20b and the locking elements 3a, 3b have locked these positions.

The swivel movement of the primary locking element 3b connected with the (compared to FIG. 1b) additional forward displacement of the seat leads solely to the fact that the curved section 31b is no longer in engagement with the stop 41 and thus a swivel movement driven by the spring 36a and transferred by the coupling rod 5 leads to rotation of the secondary locking element 4. The secondary locking element 4 thereby swivels with its curved section 42 into a snug-fit curved section 32b of the primary locking element 3b whereby a resetting movement of the fixing bolt 10b or primary locking element 3b is reliably prevented. The position of the primary locking element 3b is in practice locked by the secondary locking element 4. In order to guarantee a favourable force lock in the event of a rear impact crash the stop 33b for the bolt 10b, the complementary faces of the curved sections 32b, 42 and the swivel axis 40 should lie roughly on one line.

At the same time as the swivel movement of the secondary locking element 4, the swivel movement of the locking element 3a takes place which locks the bolt 10a. The handle 32a thereby passes into a position which can be used to monitor the proper locking. Through renewed lifting of the handle 32a the locking is released at the front directly and at the back indirectly through the secondary locking element 4 swivelling back through the coupling rod 5. With the assistance of the spring 36b the seat can now be pushed backwards whereby the claw 33b, 34b of the primary locking element 3b which is swivelling forwards gradually releases the fixing bolt. Thus the seat and its locking elements pass into a position as shown in FIG. 1a. The seat can now be lifted out of the bearing blocks 1a, 1b without problem.

Figure 2A:
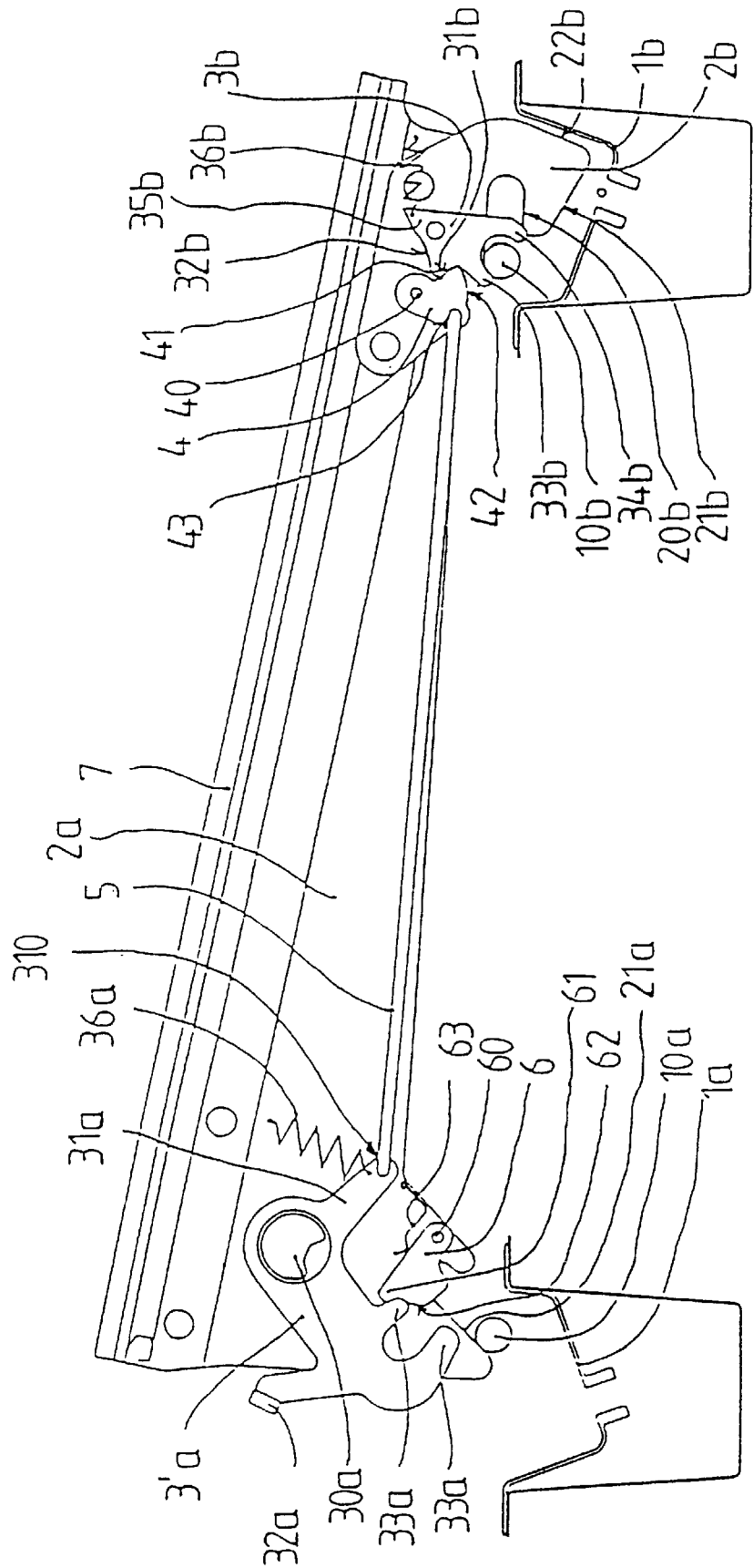
FIG. 2a is a diagrammatic side view of a seat frame after insertion in the bearing blocks of the vehicle floor and with locking elements analogous with FIG. 1, but with an additional blocking element for the front locking element.
Figure 26:
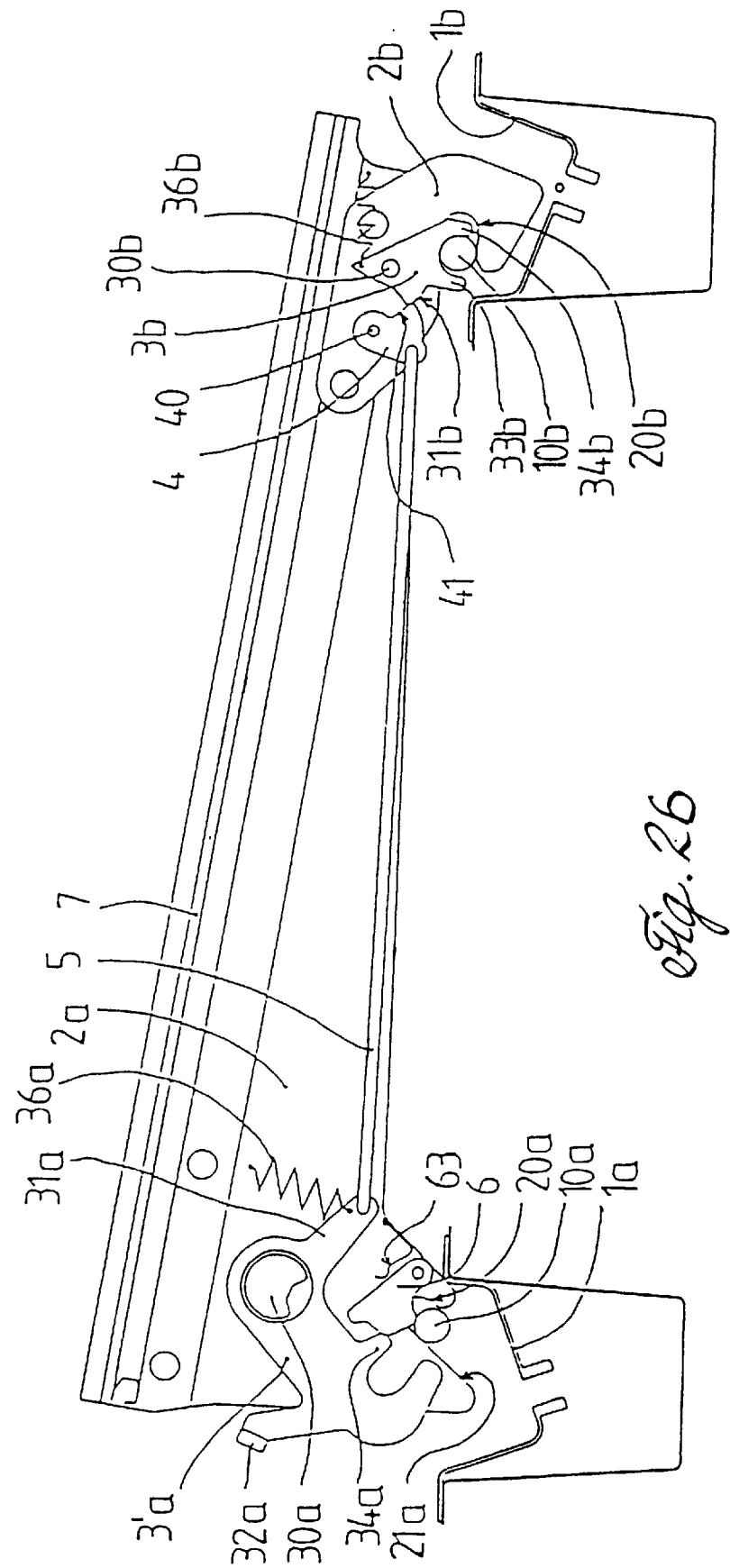
Figure 2C:
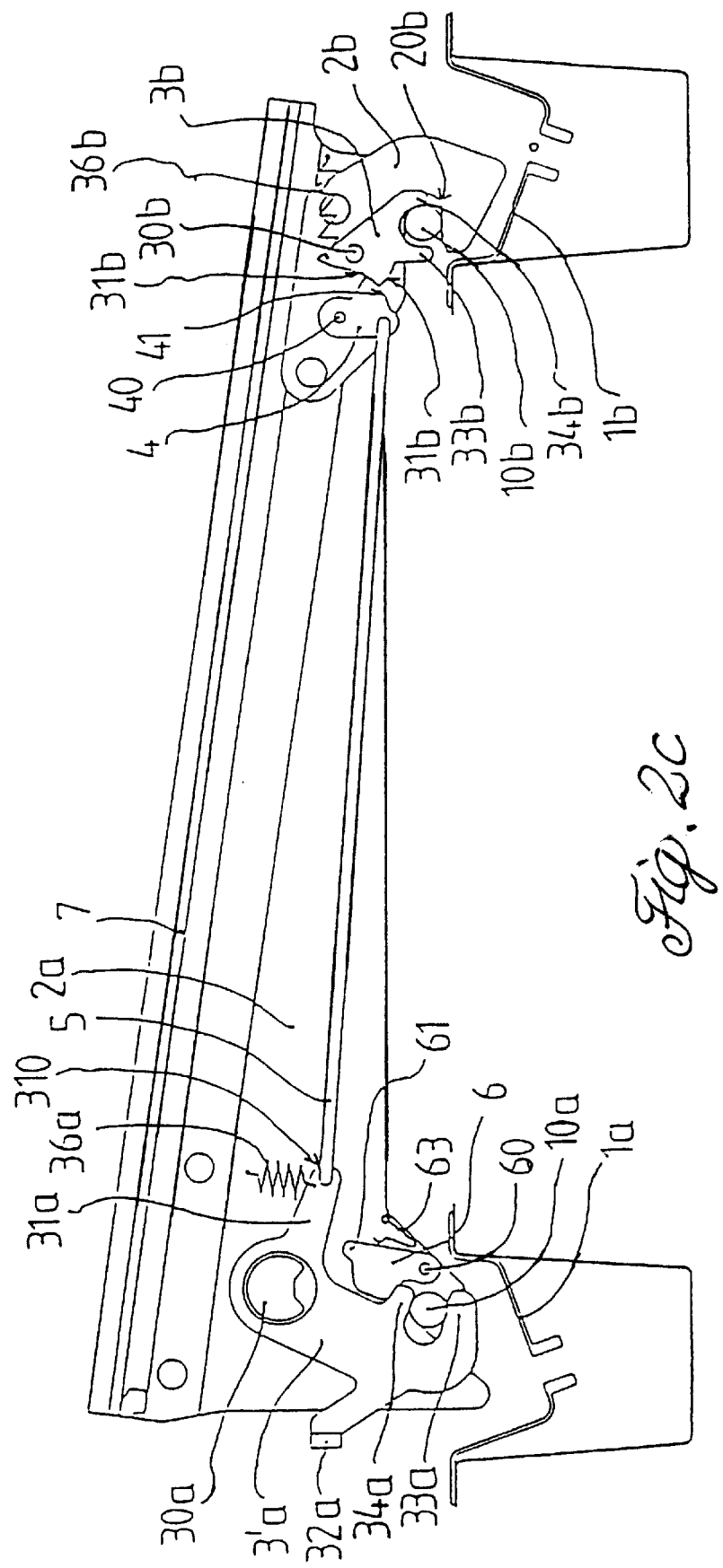
FIG. 2c is a similar view to FIG. 2a but at the end of the locking process.

FIGS. 2a to 2c show a further development of the embodiment described above in an analogous sequence of assembly processes which by adding a blocking element 6 has an increased standard of safety. It is guaranteed that the locking of the front fixing bolt 10a can also only take place when the bolt 10a has occupied the locking position already described. The release by the secondary locking element 4 of the primary element 3b pretensioned by the spring 36b can by itself alone still not lead to the front locking element 3'a swivelling in the area of the slide guide 20a.

The blocking element 6 is mounted with its end remote from the locking element 3'a for swivel movement on the support plate 2a and prior to the start of the locking process (see FIG. 2a) covers the largest part of the slide guide 20a whereby the free end with the curved section 62 and nose 61 is in engagement with the projecting stop 34a of the locking element 3'a and supports this against swivelling in. A spring 63 presses the stops 34a and 61 towards each other. Even if the proposed locking position of the rear fixing bolt 10b in the slide guide 20b ought to have been occupied, this locking cannot take place though the secondary locking element 3b and the locking movement of the front locking element 3'a. Even with moderate strain on the seat, for example by jolting against the backrest, it would become obvious that the seat is unlocked. Furthermore from the position of the handle 32a it can be concluded whether the seat locking has been properly completed or not.

If during the assembly process the contact of the front fixing bolt 10a with the stop 21a of the support plate 2a is maintained, during a forward displacement of the seat (see FIG. 2b) the bolt 10a gradually forces the blocking element 6 out of the area of the slide guide 20a. The projecting stop 34a thereby slides on the curved section 62; the position of the locking element 3'a remains unchanged.

The locking mechanisms are preferably matched with each other so that the curved section 31b relative to the stop 41 in the rear locking area as well as the curved section 62 and the stop 34a in the front locking area come out of engagement roughly at the same time during the assembly process. The spring 36a drives the locking process whereby the stop 34a presses the blocking element 6 further against the spring 63 and the hook-shaped stop 33a engages underneath the fixing bolt 10a.

On unlocking the seat the blocking element 6 falls again before the locking element 3'a. Elsewhere the same applies as already mentioned for FIGS. 1a to 1c.

What is claimed is:

1. A device for the detachable connection of a vehicle seat to the vehicle floor with a rear open fixing hook for engaging with a rear fixing bolt fixed on the vehicle floor, and a front slide guide for supporting the vehicle seat on a front fixing bolt, the device comprising:

a rotatably mounted claw-like front locking element biased by a spring force to lock the front fixing bolt in the slide guide;

a swivel mounted claw-like rear primary locking element, associated with the rear fixing bolt, which is biased by a spring force against a locking position;

a rotatably mounted rear secondary locking element; and a coupling element, wherein the position of the primary locking element on reaching the locking position can likewise be locked by a secondary locking element, and wherein the front locking element and the rear secondary locking element are connected together by the coupling element so that the front locking element can only be operated when the primary locking element has reached its locking position.

2. The device according to claim 1 wherein the primary locking element comprises two stops which form a claw for holding the rear fixing bolt.

3. The device according to at least one of the preceding claims wherein the secondary locking element is biased by a spring force in the direction of a locking position.

4. The device according to claim 3 wherein the primary locking element comprising a first curved section against which a first stop of the secondary locking element stops so long as the rear fixing bolt has still not reached its locking position inside a rear slide guide of the fixing hook, and a second curved section, wherein the secondary locking element comprises a curved section, and wherein upon reaching its locking position, the spring-biased secondary locking element swivels with its curved section in opposition to the second curved section of the primary locking element and thereby locks the position of the rear fixing bolt in a travel direction.

5. The device according to claim 1 wherein the coupling element comprises a rod whose one end is connected through a suspension mounting to the secondary locking element and whose other end is connected by a suspension mounting to the front locking element through an arm formed thereon.

6. The device according to claim 3 further comprising a spring which causes the swivel movement of both the front locking element and the secondary locking element.

7. The device according to claim 6 wherein the spring engages on the arm of the front locking element.

8. The device according to claim 1 further comprising a blocking element associated with the front locking element for preventing rotation of the front locking element into the locking position so long as the front fixing bolt engages in the front slide guide.

9. The device according to claim 8 wherein the blocking element, in a blocking position, covers a locking area of the front slide guide at least in part, and is mounted for swivel movement in an axis, and wherein a free end of the blocking element opposite the axis has a curved section which is directed axially against a stop of the front locking element, and a nose which restricts the rotation of the blocking element through engagement with the stop.

10. The device according to claim 8 wherein the blocking element is biased by a spring against the front locking element, in the direction of the front slide guide.

11. A device for detachably connecting a vehicle seat to a vehicle floor with a rear slide guide for engaging a rear fixing bolt fixed on the vehicle floor, and a front slide guide for engaging a front fixing bolt fixed to the vehicle floor, the device comprising:

a rotatably mounted front locking element biased to lock the front fixing bolt in the front slide guide;

a rotatably mounted rear locking element for locking the rear fixing bolt in the rear slide guide;

a coupling element, wherein the front locking element and the rear locking element are coupled together by the coupling element so that the front locking element can only be operated when the rear locking element has reached its locking position.

12. The device according to claim 11 wherein the rear locking element comprises:

a rotatably mounted rear primary locking element for locking the rear fixing bolt in the rear slide guide; and a rotatably mounted rear secondary locking element for locking the primary locking element in a locking position.

13. The device according to claim 12 wherein the front locking element and the rear secondary locking element are coupled together so that the front locking element can only be operated when the primary locking element has reached its locking position.

* * * * *